(12) United States Patent
Tang et al.

(10) Patent No.: US 11,929,480 B2
(45) Date of Patent: Mar. 12, 2024

(54) BATTERY AND BATTERY APPARATUS

(71) Applicant: CALB Co., Ltd., Jiangsu (CN)

(72) Inventors: Chengkun Tang, Changzhou (CN); Fangfang Pan, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 169 days.

(21) Appl. No.: 17/372,542

(22) Filed: Jul. 12, 2021

(65) Prior Publication Data

US 2022/0367939 A1 Nov. 17, 2022

(30) Foreign Application Priority Data

May 14, 2021 (CN) .......................... 202110528566.1

(51) Int. Cl.
| | |
|---|---|
| *H01M 10/6556* | (2014.01) |
| *H01M 10/613* | (2014.01) |
| *H01M 10/653* | (2014.01) |
| *H01M 10/6554* | (2014.01) |
| *H01M 50/209* | (2021.01) |
| *H01M 50/543* | (2021.01) |

(52) U.S. Cl.
CPC ..... *H01M 10/6556* (2015.04); *H01M 10/613* (2015.04); *H01M 10/653* (2015.04); *H01M 10/6554* (2015.04); *H01M 50/209* (2021.01); *H01M 50/543* (2021.01)

(58) Field of Classification Search
CPC ........... H01M 10/6556; H01M 10/613; H01M 10/653; H01M 10/6554; H01M 50/209; H01M 50/543; H01M 10/0481; H01M 10/425; H01M 10/6551; H01M 50/103; H01M 50/15; H01M 50/547; H01M 10/647; Y02E 60/10

See application file for complete search history.

(56) References Cited

U.S. PATENT DOCUMENTS

| | | | |
|---|---|---|---|
| 2001/0031392 A1 | 10/2001 | Ogata et al. | |
| 2007/0251830 A1* | 11/2007 | Conrad | ................... C25B 11/00 205/508 |
| 2012/0094160 A1* | 4/2012 | Lee | ................... H01M 10/6551 413/4 |
| 2016/0064782 A1 | 3/2016 | Lee et al. | |
| 2018/0337434 A1* | 11/2018 | Burgers | ................... F28F 3/12 |
| 2020/0274208 A1* | 8/2020 | Sucke | ................. H01M 50/169 |
| 2023/0057993 A1* | 2/2023 | Lee | ..................... H01M 50/262 |

FOREIGN PATENT DOCUMENTS

| | | |
|---|---|---|
| CN | 110993850 | 4/2020 |
| KR | 20160075068 | 6/2016 |

OTHER PUBLICATIONS

"Search Report of Europe Counterpart Application", dated Jan. 5, 2022, p.1-p. 10.

* cited by examiner

*Primary Examiner* — Muhammad S Siddiquee
(74) *Attorney, Agent, or Firm* — JCIP GLOBAL INC.

(57) ABSTRACT

The disclosure relates to the technical field of batteries, and proposes a battery and a battery apparatus. The battery includes: a housing; a cell, the cell disposed in the housing. A pole element is disposed on the housing. A heat sink is disposed on the housing.

21 Claims, 16 Drawing Sheets

BATTERY AND BATTERY APPARATUS

CROSS-REFERENCE TO RELATED APPLICATION

This application claims the priority benefit of China application serial no. 202110528566.1, filed on May 14, 2021. The entirety of the above-mentioned patent application is hereby incorporated by reference herein and made a part of this specification.

BACKGROUND

1. Technical Field

The disclosure relates to battery technology, in particular to a battery and a battery apparatus.

2. Description of Related Art

In the related art, the battery apparatus includes multiple batteries, and a large amount of heat collection and other problems may occur during the use of the battery apparatus; also, only the liquid cooling plate is used to dissipate heat, which is weak in dissipation capacity and sometimes causes safety problems.

SUMMARY

The disclosure provides a battery and a battery apparatus so as to improve the performance of the battery.

According to a first aspect of the disclosure, there is provided a battery. The battery includes: a housing; a cell, the cell disposed in the housing; a pole element, the pole element disposed on the housing; and a heat sink, the heat sink disposed on the housing.

The battery according to an embodiment of the disclosure includes a housing, a cell, a pole element, and a heat sink. The cell is sealed in the housing, and the pole element and the heat sink are both disposed on the housing. By disposing the heat sink on the housing, the heat sink may discharge the heat of the battery in time so as to avoid a large amount of heat inside the battery, thereby ensuring the safety performance of the battery.

According to a second aspect of the disclosure, there is provided a battery apparatus. The battery apparatus includes multiple batteries disposed along a first direction, the battery including: a housing; a cell, the cell disposed in the housing; a pole element, the pole element disposed on the housing; and a heat sink, the heat sink disposed on the housing.

The battery apparatus according to an embodiment of the disclosure includes at least two batteries. The battery apparatus is by individual batteries stacked, each battery including a housing, a cell, a pole element and a heat sink. By disposing the heat sink on the housing, the heat sink may discharge the heat of the battery in time so as to avoid a large amount of heat inside the battery, thereby ensuring the safety performance of the battery apparatus.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
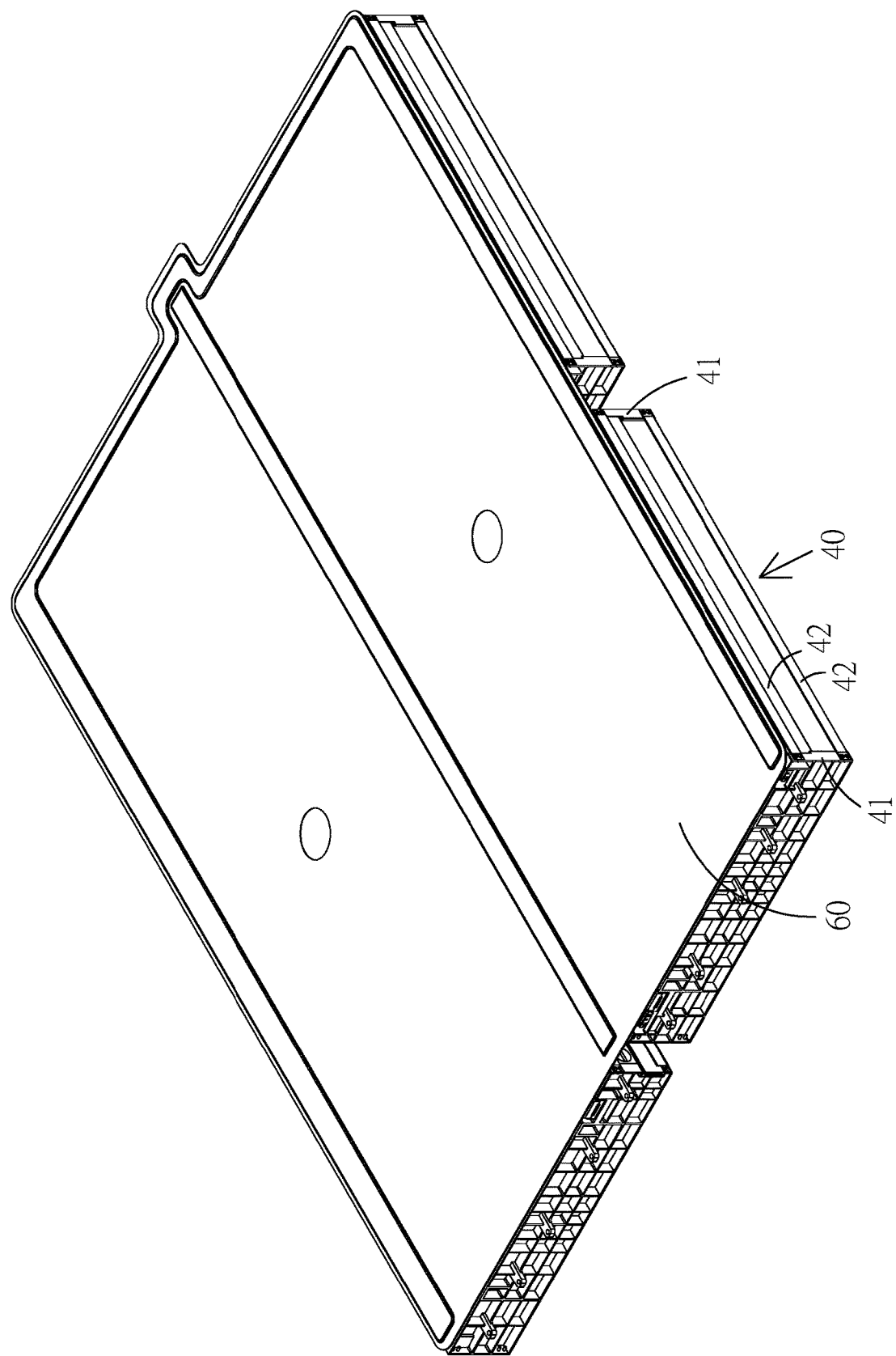
FIG. 1 is a schematic diagram showing a partial structure of a battery pack according to an exemplary embodiment.

The following will clearly and completely describe the technical solutions in the exemplary embodiments of the disclosure with reference to the accompanying drawings in the exemplary embodiments of the disclosure. The exemplary embodiments described herein are for illustrative purposes only, and are not intended to limit the scope of protection of the disclosure. Therefore, it should be understood that various modifications and changes may be made to the exemplary embodiments without departing from the scope of protection of the disclosure.

In the description of the disclosure, unless expressly stipulated and limited otherwise, the terms "first" and "second" are only used for descriptive purposes, and cannot be understood as indicating or implying relative importance. The terms "multiple" and "plural" refer to two or more. The term "and/or" includes any combination and all combinations of one or more of the related listed items. In particular, reference to "the/said" object or "an" object is also intended to mean one of many possible such objects. In particular, reference to "the/said" object or "an" object is also intended to indicate one of a number of such objects possible.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. Referring to FIG. 6 to FIG. 9, the battery includes a housing 10; a cell 20, the cell 20 disposed in the housing 10; a pole element 70, the pole element 70 disposed on the housing 10; and a heat sink 30, the heat sink 30 disposed on the housing 10.

The battery of one embodiment of the disclosure includes the housing 10, the cell 20, the pole element 70, and the heat sink 30. The cell 20 is sealed in the housing 10, and the pole element 70 and the heat sink 30 are both disposed on the housing 10. By disposing the heat sink 30 on the housing 10, the heat sink 30 can discharge the heat of the battery in time so as to avoid a large amount of heat inside the battery, thereby ensuring the safety performance of the battery.

In one embodiment, the heat sink 30 is disposed around a circumferential outer edge of the housing 10. In other words, the heat sink 30 forms a circumferentially closed structure to ensure the housing 10 to dissipate heat in time.

Optionally, the heat sink 30 may be a circumferentially unclosed structure. Further, the heat sink 30 may include multiple sub-heat sinks disposed at intervals.

Figure 6:
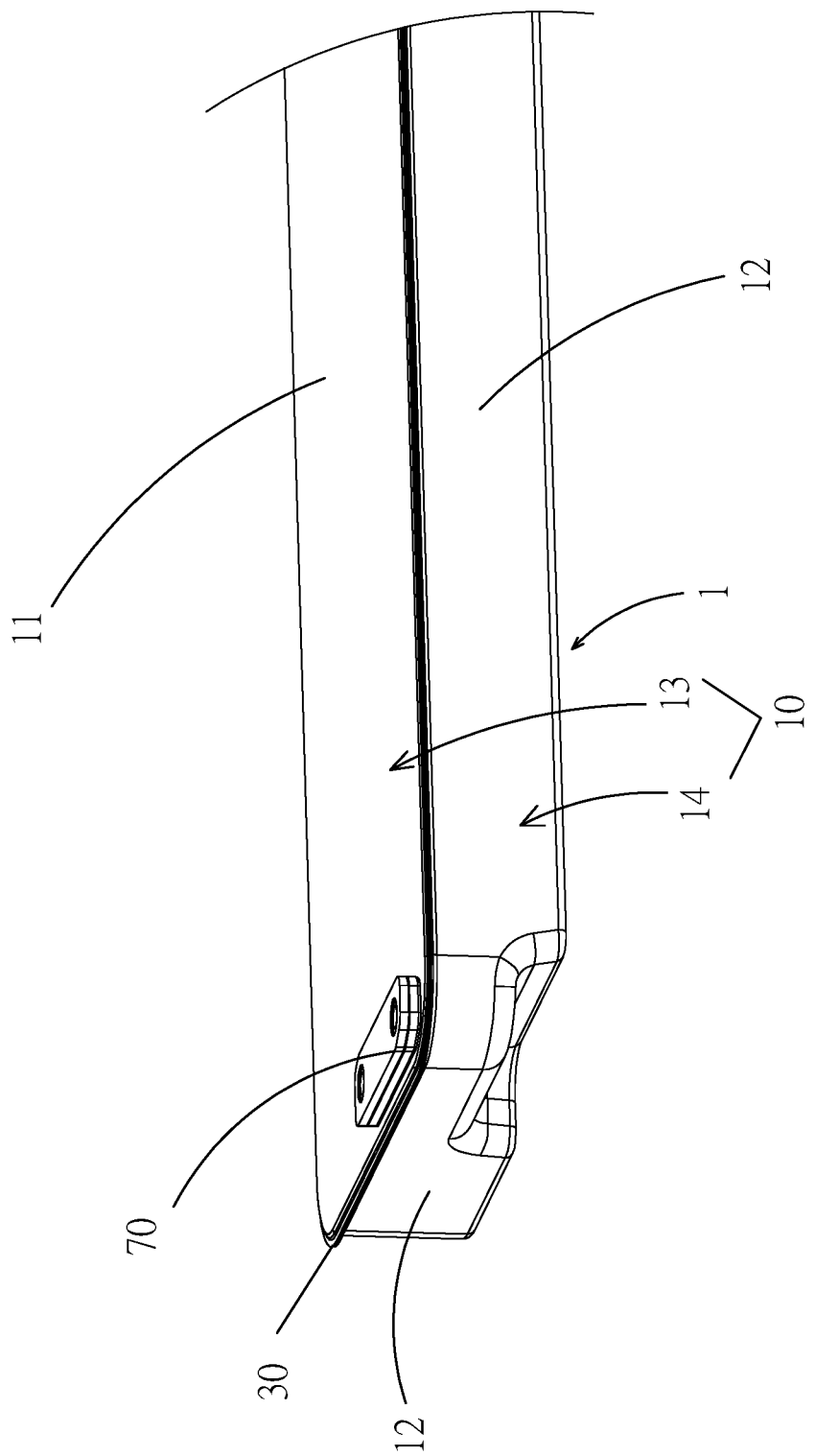
FIG. 6 is a schematic diagram showing a partial structure of a battery according to an exemplary embodiment.
Figure 7:
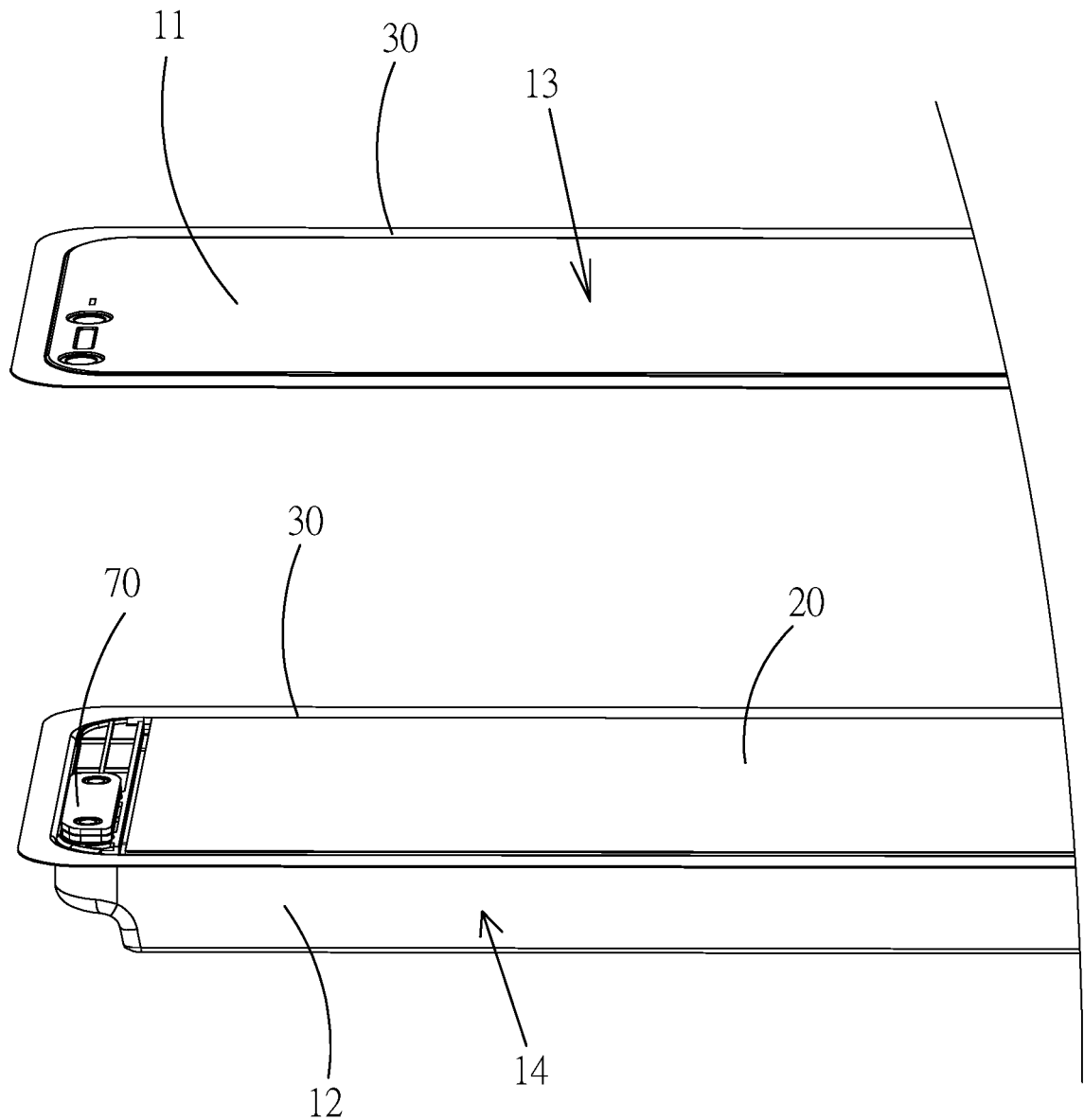
FIG. 7 is a schematic diagram showing a partially exploded structure of a battery according to an exemplary embodiment.
Figure 8:
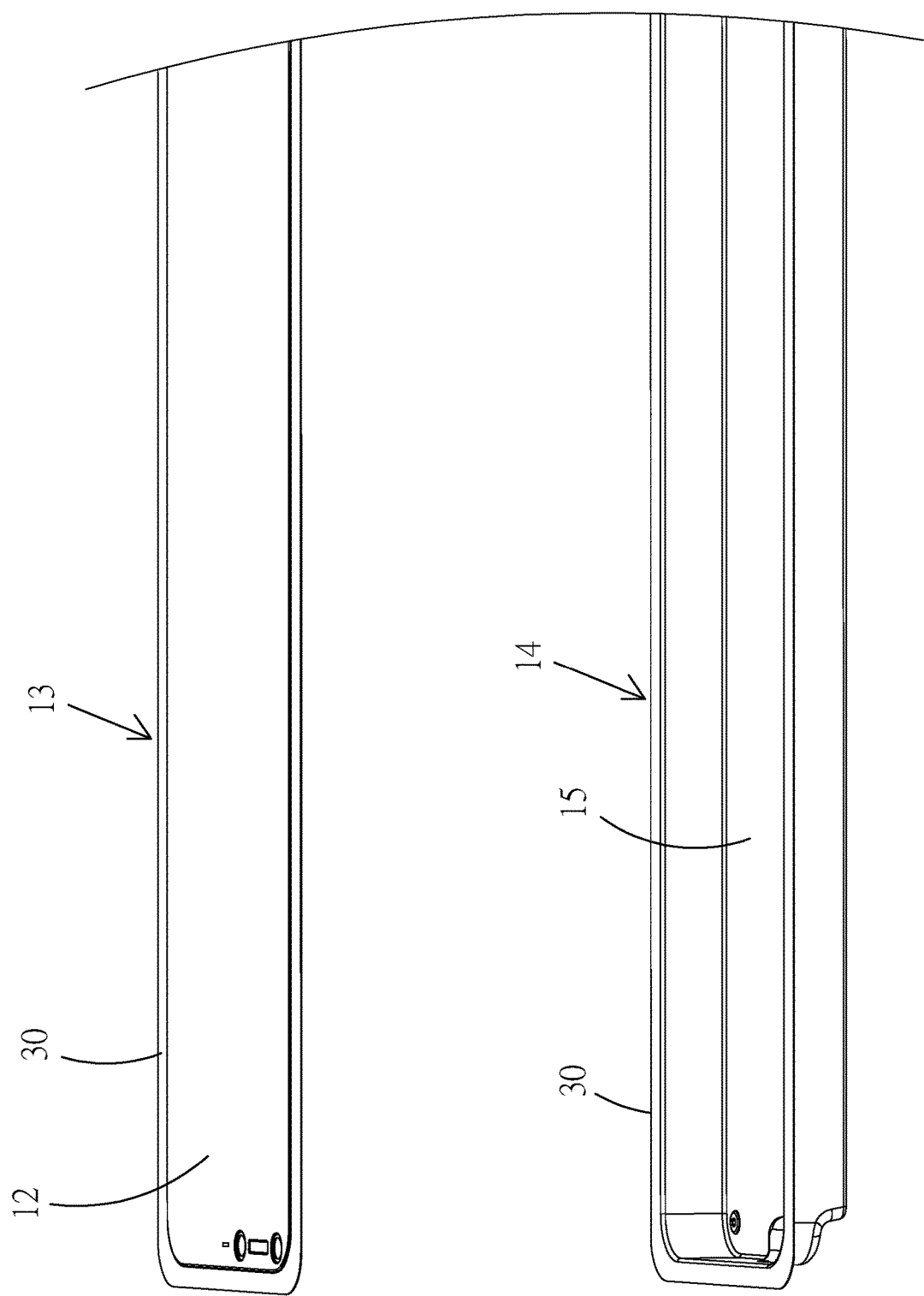
FIG. 8 is a schematic diagram showing a partially exploded structure of a housing according to an exemplary embodiment.

In one embodiment, as shown in FIGS. 6 to 8, the housing 10 includes: a first housing member 13; and a second housing member 14, the second housing member 14 connected to the first housing member 13 so as to enclose the cell 20. At least one of the first housing member 13 and the second housing member 14 is provided with a heat sink 30 thereon, so as to ensure that the heat on the housing 10 can be discharged in time through the heat sink 30.

Optionally, the heat sink 30 may be disposed around a circumferential direction of the first housing member 13, and the heat sink 30 may be disposed around a circumferential direction of the second housing member 14. The heat sink 30 may be a closed ring structure or a discontinuous structure.

In one embodiment, as shown in FIG. 8, a circumferential outer edge of the first housing member 13 is provided with the heat sink 30, and a circumferential outer edge of the second housing member 14 is provided with the heat sink 30. The heat sink 30 on the first housing member 13 is welded to the heat sink 30 on the second housing member 14, such that the first housing member 13 and the second housing member 14 are connected through the heat sink 30, thereby ensuring the reliability of welding.

In one embodiment, the first housing member 13 and the heat sink 30 thereon are integrally formed, which not only facilitates processing, but also ensures the stability of the structure.

Correspondingly, the second housing member 14 and the heat sink 30 thereon are integrally formed, which not only facilitates processing, but also ensures the stability of the structure.

Optionally, the first housing member 13 and the heat sink 30 thereon are integrally formed, and the second housing member 14 and the heat sink 30 thereon are also integrally formed, such that when the first housing member 13 and the second housing member 14 are subsequently connected, the heat sink 30 on the first housing member 13 and the heat sink 30 on the second housing member 14 may be welded. The heat sink 30 not only is disposed to ensure increased welding area, thereby improving the stability of the welding, but also can serve as heat dissipation.

In some embodiments, it is possible that the first housing member 13 and the heat sink 30 thereon are two independently formed structures and may be connected by welding or the like subsequently. Correspondingly, it is possible that the second housing member 14 and the heat sink 30 thereon are two independently formed structures and may be connected by welding or the like subsequently.

In some embodiments, at least one of the first housing member 13 and the second housing member 14 is formed having an accommodating cavity 15. After the first housing member 13 and the second housing member 14 are butted, the cell 20 is located inside the accommodating cavity 15 so as to ensure reliable sealing of the cell 20.

Optionally, the first housing member 13 and the second housing member 14 may both be formed having an accommodating cavity 15, and the depth of the accommodating cavity 15 of the first housing member 13 and of the second housing member 14 may be the same or different; no limitation is imposed herein.

Optionally, the first housing member 13 is a flat plate, and the second housing member 14 is formed having an accommodating cavity 15. The cell 20 is located inside the accommodating cavity 15. The disposition of the flat plate may facilitate subsequent connections and is less difficult to process.

Optionally, a thickness of the first housing member 13 is uniform, which not only has strong structural stability, but also facilitates processing. A thickness of the second housing member 14 is uniform. The thickness of the first housing member 13 may be equal to the thickness of the second housing member 14.

It should be noted that the heat sink 30 may be understood as a flange edge, such as a flange edge formed extending outward from a circumferential outer edge of a flat plate, or a flange edge formed extending outward from the side wall of a structure having the accommodating cavity 15, wherein the flange edge is substantially perpendicular to the side wall. For the first housing 13 and the second housing 14 being provided with the heat sinks 30 at the circumferential outer edges as described in the above-mentioned embodiment, reference may be made to such configuration, such that the heat sink 30 and the first housing member 13 and the heat sink 30 of the second housing member 14 may directly face each other, thereby facilitating the connection.

In one embodiment, the cell 20 includes a cell main body 21 and an electrode tab 22. The electrode tab 22 extends from a length direction of the cell main body 21, and the electrode tab 22 extends from a side of the cell main body 21. The battery 1 further includes a pole element 70, the pole element 70 is installed on the housing 10, and the pole element 70 is connected with the electrode tab 22. The pole element 70 may be disposed on the first housing member 13 or the second housing member 14.

In one embodiment, a length of the battery is a, in which 400 mm≤a≤2500 mm. A width of the battery is b, and a height of the battery is c, in which 2b≤a≤50b and/or 0.5c≤b≤20c.

Further, 50 mm≤b≤200 mm and 10 mm≤c≤100 mm.

Preferably, 4b≤a≤25b and/or 2c≤b≤10c.

In the battery in the embodiment, under the condition that sufficient energy density is ensured, a ratio of the length to the width of the battery is larger, and further, a ratio of the width to the height of the battery is larger.

In one embodiment, a length of the battery is a, and a width of the battery is b, 4b≤a≤7b. In other words, a ratio of the length to the width of the battery in the present embodiment is larger, thereby increasing an energy density of the battery and facilitating the subsequent formation of the battery apparatus.

In one embodiment, a height of the battery is c, 3c≤b≤7c, and a ratio of the battery width to the height is relatively large, which also ensures formation of the battery while ensuring sufficient energy density.

Optionally, a length of the battery may be 500 mm-1500 mm, a width of the battery may be 80 mm-150 mm, and a height of the battery may be 15 mm-25 mm.

It should be noted that the length of the battery is a size of the battery in a length direction, the width of the battery is the size of the battery in a width direction, and the height of the battery is a size of the battery in the height direction, namely a thickness of the battery.

An embodiment of the disclosure further provides a battery apparatus, including multiple batteries 1 disposed along a first direction. The battery 1 includes a housing 10; a cell 20, the cell 20 disposed in the housing 10; a pole element 70, the pole element 70 disposed on the housing 10; and a heat sink 30, the heat sink 30 disposed on the housing 10.

The battery apparatus according to an embodiment of the disclosure includes at least two batteries 1. The battery apparatus is formed by individual batteries 1 stacked, each battery 1 including the housing 10, the cell 20, the pole element 70, and the heat sink 30. By disposing the heat sink 30 on the housing 10, the heat sink 30 can discharge the heat of the battery 1 in time so as to avoid a large amount of heat inside the battery 1, thereby ensuring the safety performance of the battery apparatus.

In one embodiment, the housing 10 includes two first surfaces 11 opposite in the first direction and four second surfaces 12 disposed around the first surfaces 11. At least one second surface 12 is provided with a heat sink 30 thereon, and the heat sink 30 extends from the second surface 12, thereby ensuring that the heat sink 30 can discharge the heat in time.

Further, an area of the first surface 11 is larger than an area of the second surface 12. The battery apparatus includes the multiple batteries 1 disposed in the first direction. The housing 10 includes the two first surfaces 11 opposite in the first direction. In other words, two adjacent first surfaces 11 of two adjacent batteries 1 are stacked, and large surfaces of the two adjacent batteries 1 directly face each other, thereby forming a stack. The stacking may be up and down or left and right. The two adjacent first surfaces 11 are stacked, in which the two first surfaces 11 of the two batteries 1 may be in direct contact or indirect contact; no limitation is imposed herein.

The housing 10 includes the two opposite first surfaces 11 and the four second surfaces 12 disposed around the first surfaces 11. The housing 10 may have an approximately rectangular structure; while ignoring processing and manufacturing errors and the like, the housing 10 may be a rectangular structure.

The heat sink 30 is disposed on the second surface 12. From a structural point of view, such design can ensure that the heat sink 30 does not affect the stacking of the two adjacent batteries 1. Moreover, the heat sink 30 extends outward relative to the main body of the battery 1, such that the heat can be discharged in time. The heat sink 30 may extend from the first surface 11. That is, the heat sink 30 is located at the edge of the second surface 12, but it is also located on the second surface 12 in terms of the structural form. Alternatively, the heat sink 30 may be located at a middle of the second surface 12. When the housing 10 has a rectangular structure, the heat sink 30 may be approximately perpendicular to the second surface 12.

Optionally, each second surface 12 may be provided with a heat sink 30 thereon. Needless to say, it may also be possible that one or at least two of the four second surfaces 12 are not provided with a heat sink 30 thereon.

It should be noted that the housing 10 has a length direction and a width direction, and the length direction and the width direction are both linear directions. The length direction may be a longer extension direction of the housing 10, and the width direction may be a shorter extension direction of the housing 10. The two opposite first surfaces 11 are large surfaces of the housing 10, and the four second surfaces 12 are small surfaces of the housing 10. The four second surfaces 12 include two pairs of the small surfaces, namely a first pair of the small surfaces extending along the length direction of the housing 10 and a second pair of the small surfaces extending along the width direction of the housing 10, wherein an area of the first pair of the small surfaces is larger than an area of the second pair of small surfaces, but both are smaller than an area of the large surface.

Optionally, each housing 10 is correspondingly provided with one heat sink 30. In some embodiments, one housing 10 may be provided with at least two heat sinks 30. The at least two heat sinks 30 may be disposed on the second surface 12 of the housing 10 at intervals. The at least two of the heat sinks 30 herein are to illustrate that a distance between each heat sink 30 and a same first surface 11 is not equal; when the housing 10 is placed horizontally, the two heat dissipation fins 30 form a vertically distributed structure.

In some embodiments, the housing 10 may be a metal housing, and the heat sink 30 may also be made of metal. Optionally, the material of the housing 10 may be stainless steel or aluminum, which has good corrosion resistance and sufficient strength. The material of the heat sink 30 may be stainless steel or aluminum.

Figure 2:
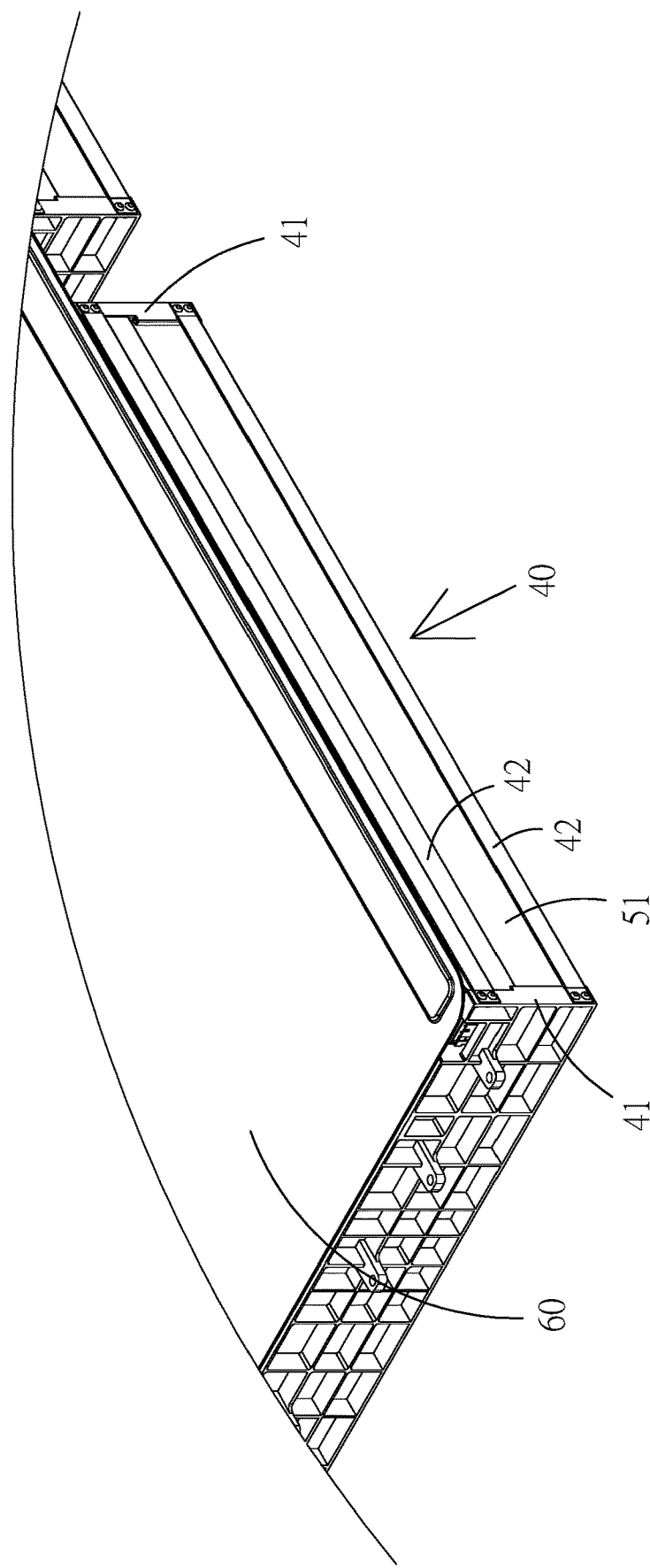
FIG. 2 is a schematic diagram showing a partial structure of a battery pack according to an exemplary embodiment.

In one embodiment, as shown in FIGS. 1 and 2, the battery apparatus further includes: a frame assembly 40, the frame assembly 40 formed with a clamping space. Each battery 1 is located in a clamping space, such that during subsequent packing of the battery apparatus, problems such as scattered battery apparatuses can be avoided.

The frame assembly 40 is configured to ensure a certain pre-tightening force between the battery 1 and the battery 1. Considering that the battery 1 needs to be put directly into a case, it is difficult to put the battery 1 in without being restrained first before being put in. Therefore, the battery 1 may be restrained by the frame assembly 40.

In one embodiment, as shown in FIG. 2, the frame assembly 40 includes: first pretensioners 41, the first pretensioners 41 being two, the two first pretensioners 41 disposed opposite to each other, and each battery 1 clamped between the two first pretensioners 41; and a second pretensioner 42, the second pretensioner 42 connected with the two first pretensioners 41 to clamp the battery 1 in the clamping space, so as to ensure that each battery 1 is subjected to a certain pre-tensioning force, thereby avoiding loosening of the batteries.

It should be noted that each battery 1 is clamped between the two first pretensioners 41, the second pretensioner 42 is to ensure that a certain squeezing force may be generated between the two first pretensioners 41, so as to ensure that a distance between the two first pretensioners 41 is fixed, thereby ensuring that each battery is subjected to certain pre-tensioning force. The second pretensioner 42 may not need to be in contact with the battery 1, and it is mainly configured to provide a clamping force to the two first pretensioners 41. Needless to say, the second pretensioner 42 may also be in contact with the battery 1. The first pretensioners 41 may directly contact the battery 1. Of course, the first pretensioners 41 and the battery 1 may be provided with other components therebetween.

In one embodiment, the second pretensioners 42 are disposed in pairs. A pair of the two second pretensioners 42 are respectively located at two sides of the battery 1 and forms a clamping space with the two first pretensioners 41, so as to ensure that each battery 1 is located in a circumferentially closed clamping space, thereby ensuring that each battery 1 is located at a relatively fixed position and avoiding problems such as shaking and scattering.

In some embodiments, the second pretensioner 42 is a circumferentially closed structure so as to cover each battery 1 and the two first pretensioners 41. That is, the second pretensioner 42 is disposed around the first pretensioners 41 and the battery 1, such that each battery 1 and the two first pretensioners 41 may be tightly pressed against the circumferential closed space formed by the second pretensioner 42, thereby ensuring the reliable clamping of the battery 1.

Optionally, the two first pretensioners 41 and the second pretensioner 42 may be an integral structure, which not only facilitates installation, but also ensures sufficient stability.

The first pretensioner 41 and the second pretensioner 42 may be an integrally formed cable tie. It may also be that that multiple independently formed plate body structures are subsequently connected to form an integral structure to facilitate subsequent assembly of the battery 1.

In some embodiments, the first pretensioner 41 is an end plate, and the end plate is directly opposite to one first surface 11 of one battery 1. The second pretensioner 42 is a cable tie, and the cable tie may be directly opposite to one second surface 12 of each battery 1. The two first pretensioners 41 respectively contact the large surfaces of the two batteries 1 located on an outermost side, so as to provide a reliable pre-tensioning force. Moreover, because the heat sink 30 is not located on the first surface 11, problems such as contact with the end plate can be avoided. The cable tie may be configured to connect the two end plates without causing damage to the heat sink 30, so as to ensure the reliability of the connection.

Optionally, the first pretensioner 41 is an end plate, and the end plate may be directly opposed to one second surface 12 of each battery 1. The second pretensioner 42 is a cable tie, and the cable tie may be directly opposite to one first surface 11 of one battery 1. The cable tie needs to restrain the large surfaces of the two batteries 1 located on the outermost side, and the second surface 12 corresponding to the end plate may not need to be provided with the heat sink 30 thereon.

In some embodiments, the cable tie may be a steel rolled tie. Of course, it may also be other common cable ties in related technologies such as a nylon rolled tie or a plastic cable tie.

In some embodiments, embodiments in which the first pretensioner 41 and the second pretensioner 42 are both plate bodies may be possible. For example, the first pretensioner 41 is an end plate, and the second pretensioner 42 is a side plate.

Figure 4:
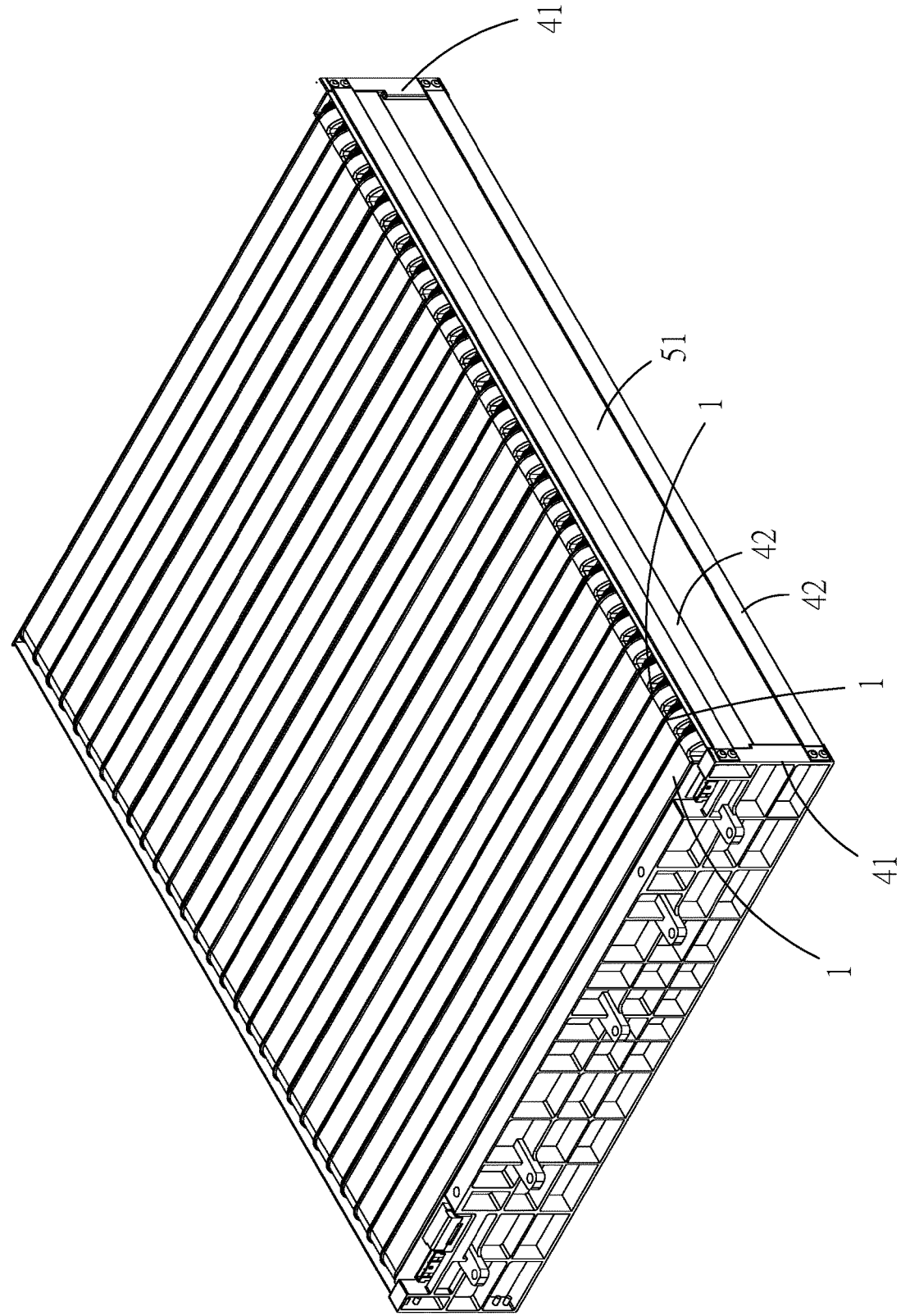
FIG. 4 is a schematic diagram showing a structure of a battery apparatus according to an exemplary embodiment.
Figure 5:
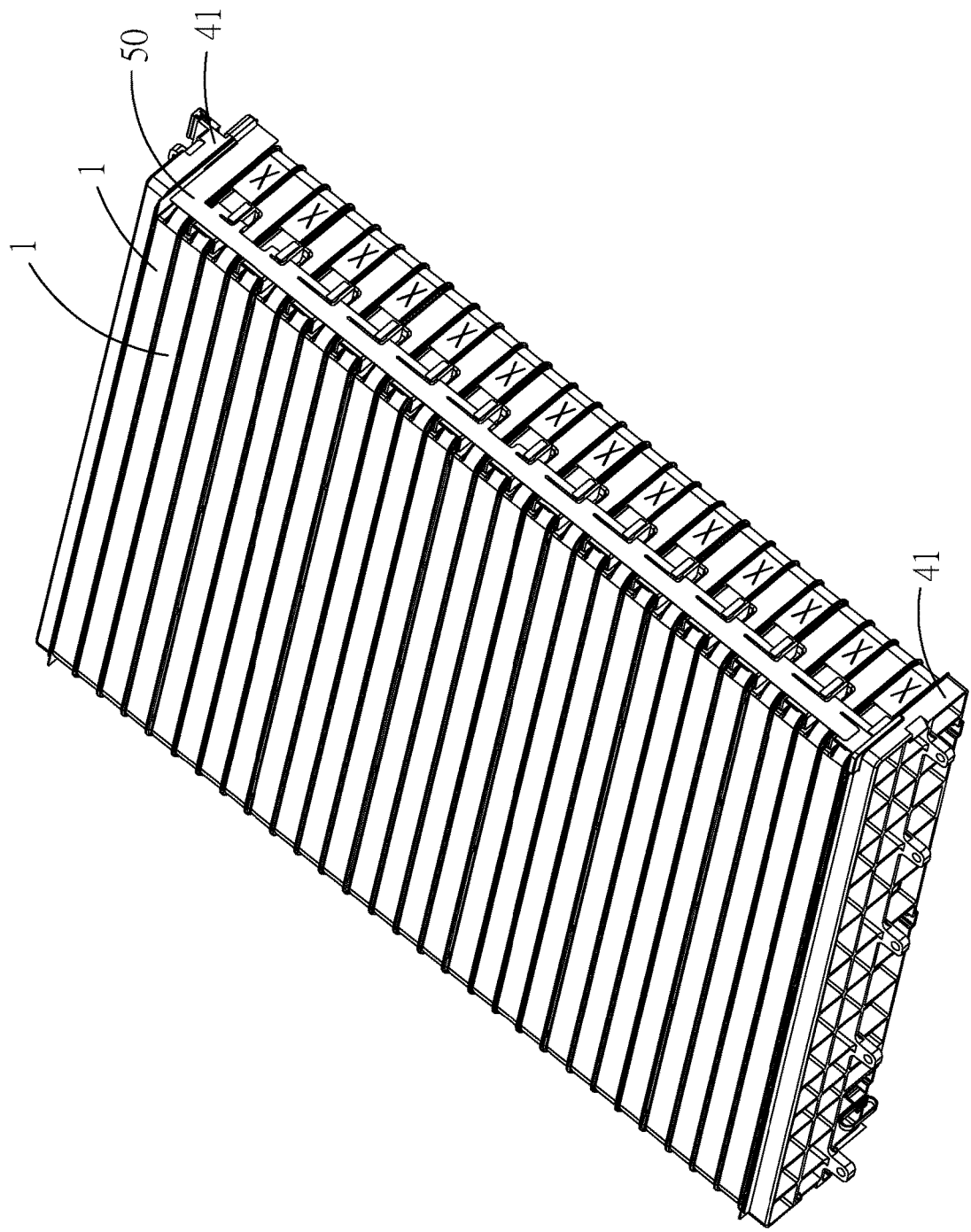
FIG. 5 is a schematic diagram showing a partial structure of a battery apparatus according to an exemplary embodiment.

In an embodiment, as shown in FIG. 2, FIG. 4, and FIG. 5, the battery apparatus further includes: a circuit board 50, the circuit board 50 disposed on a side of the battery 1; and a separator 51, the separator 51 located on a side of the circuit board 50 away from the battery 1 and the second pretensioner 42 pressed on the separator 51. The circuit board 50 is configured for signal collection and may collect the temperature and voltage of the battery 1. With the second pretensioner 42, the separator 51 can be fixed, and the separator 51 can electrically insulate the circuit board 50 and external components.

Optionally, the circuit board 50 is fixed on a side of the battery 1, namely where the second surface 12 is located, also where the second surface 12 having a smaller area is located.

It should be noted that the circuit board 50 may stably monitors the battery 1 by being connected to the temperature detection member. Also, the circuit board 50 may be electrically connected to the battery 1 so as to collect the voltage of the battery 1. The specific functions of the circuit board 50 are not limited, and may be determined according to actual needs. The present embodiment intends to illustrate that the separator 51 configured to isolate the circuit board 50 may be fixed by the second pretensioner 42.

Optionally, the circuit board 50 may be a flexible printed circuit (FPC), and the separator 51 may be made of an insulating material, such as plastic, rubber, and the like.

Figure 9:
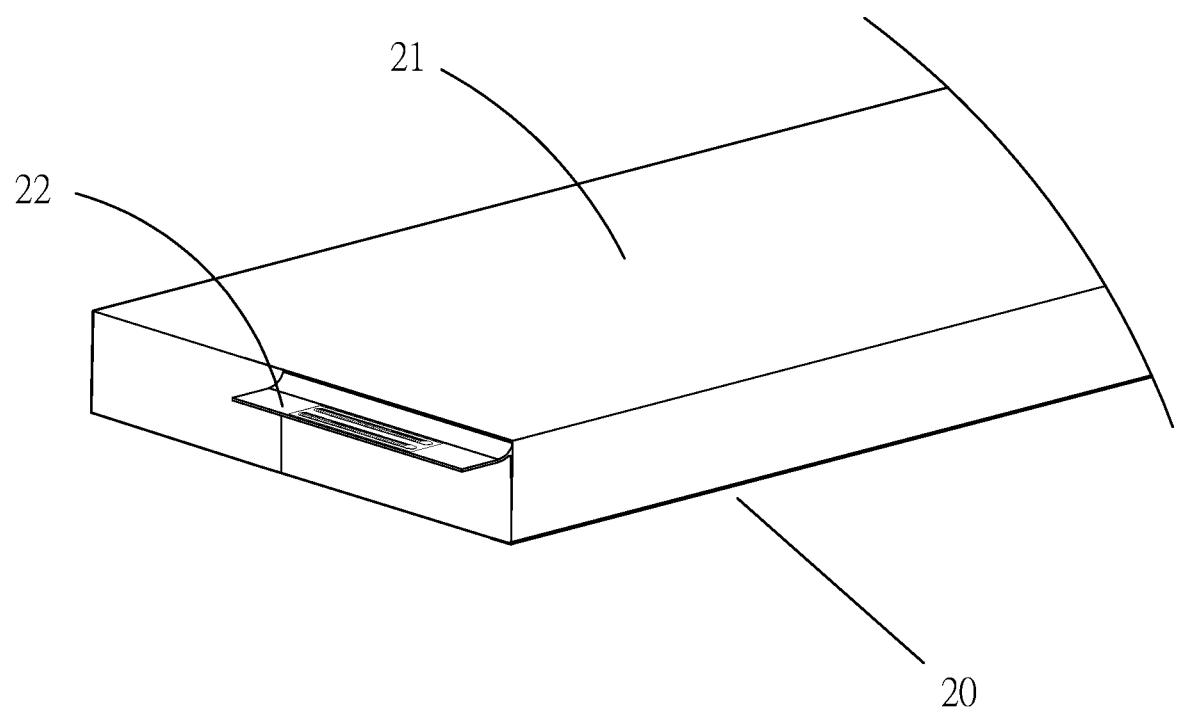
FIG. 9 is a schematic diagram showing a partial structure of a cell according to an exemplary embodiment.
Figure 10:
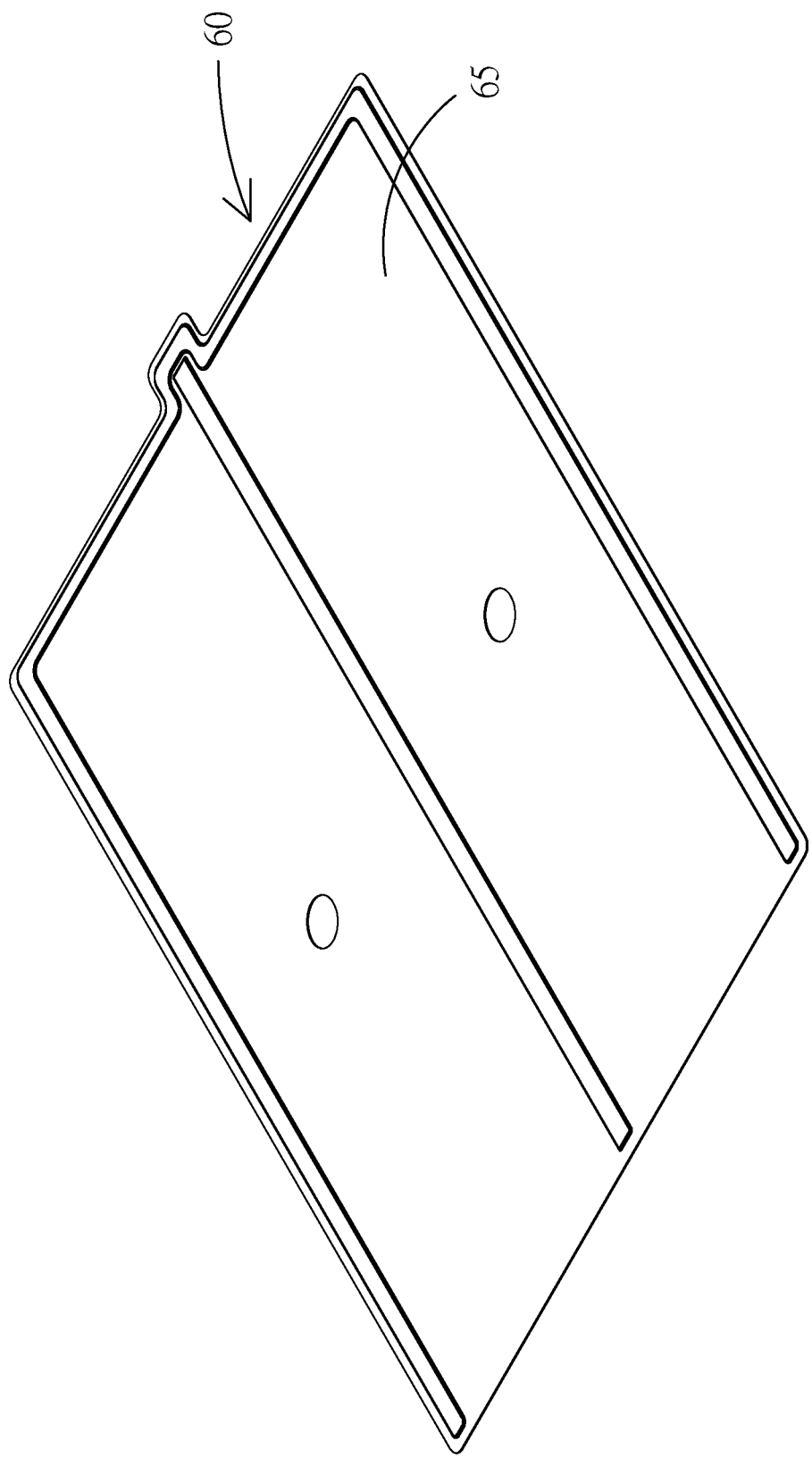
FIG. 10 is a schematic diagram showing a structure of a view angle of a temperature regulating board according to an exemplary embodiment.
Figure 11:
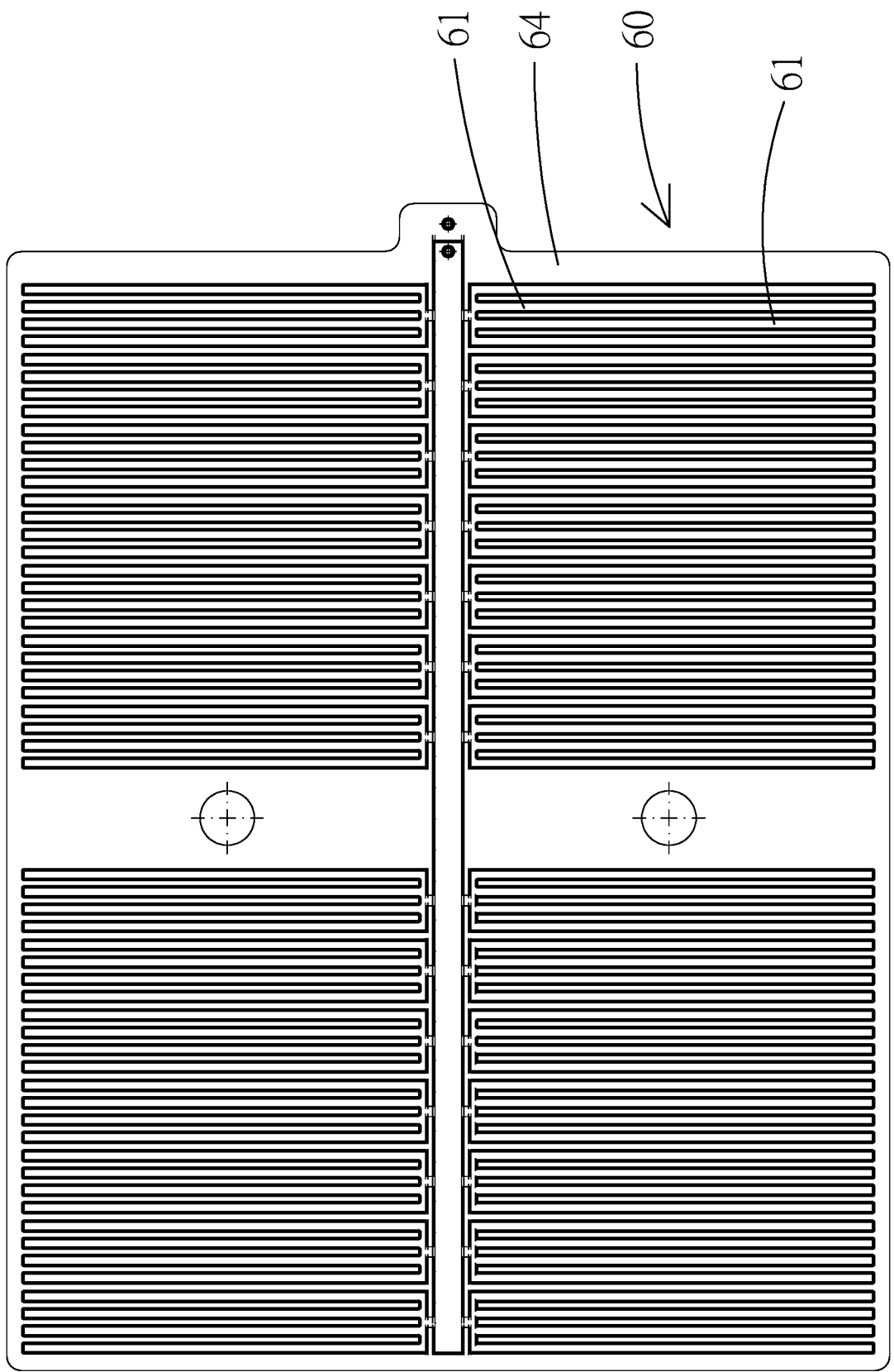
FIG. 11 is a schematic diagram showing a structure of another view angle of a temperature regulating board according to an exemplary embodiment.

As shown in FIGS. 6, 7, and 9, the cell 20 includes a cell main body 21 and an electrode tab 22. The electrode tab 22 extends from a length direction of the cell main body 21, and the electrode tab 22 extends from a side of the cell main body 21. The battery 1 further includes the pole element 70, the pole element 70 installed on the housing 10, the pole element 70 connected to the electrode tab 22, and the circuit board 50 electrically connected to the electrode tab 22 through the pole element 70. The electrode tab 22 and the pole element 70 may be directly connected; that is, the electrode tab 22 and the pole element 70 may be directly welded. Alternatively, the electrode tab 22 and the pole element 70 may be connected through a metal adapter, in which the specific connection method may be welding, riveting, and the like; no limitation is imposed herein.

In some embodiments, the pole element 70 is disposed on the first surface 11. In some embodiments, the pole element 70 may also be disposed on the second surface 12.

It should be noted that the cell main body 21 includes more than two electrode sheets, and the electrode tab 22 includes more than two single-piece electrode tabs. The single-piece electrode tabs respectively extend from the corresponding electrode sheets. A width of the single-piece electrode tab is smaller than a width of the electrode sheet. The multiple single-piece electrode tabs are stacked to form the electrode tab 22, which is connected with the pole element 70. The electrode tab 22 may be welded to the pole element 70. The single-piece electrode tabs may be made of metal foil with good electrical and thermal conductivity, such as aluminum, copper, or nickel.

In some embodiments, the electrode pillar assemblies 70 may be two, and the two electrode pillar assemblies 70 are respectively a positive pole element and a negative pole element. The electrode tabs 22 may also be two, and the two electrode tabs 22 are respectively a positive electrode tab and a negative electrode tab. The positive pole element is connected with the positive electrode tab, and the negative pole element is connected with the negative electrode tab. At this time, the circuit boards 50 may also be two, and the two circuit boards 50 are respectively located on two sides of the battery 1, so as to realize signal collection on the two sides. The second pretensioner 42 needs to fix the separators 51 corresponding to the two circuit boards 50. The second pretensioner 42 may be a circumferentially closed structure, or the second pretensioner 42 may be a pair of two.

It should be noted that the pole element 70 is disposed insulated from the housing 10. For example, an insulating member may be configured for the insulation between the two, or an insulating coating may be configured for the insulation between the two; no limitation is imposed herein.

Figure 3:
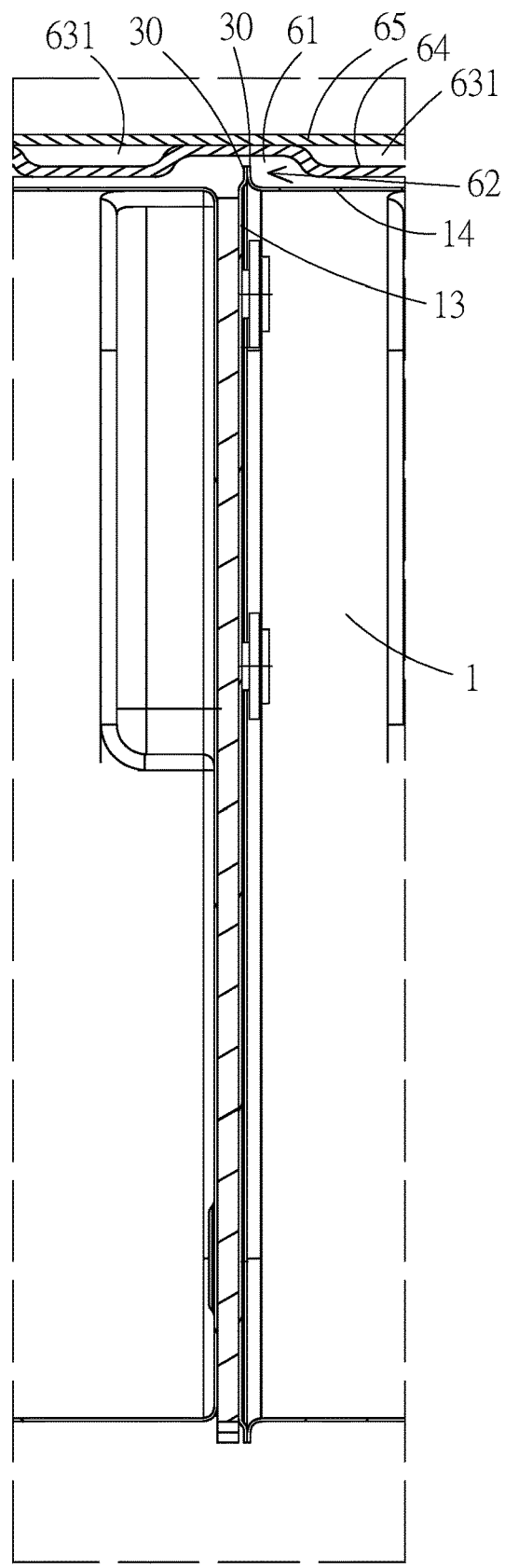
FIG. 3 is a schematic diagram showing a partial cross-sectional structure of a battery pack according to an exemplary embodiment.

In one embodiment, as shown in FIGS. 2 and 3, the battery apparatus further includes: a temperature regulating board 60. The temperature regulating board 60 is provided with an accommodating groove 61 on an outside, and the accommodating groove 61 accommodates the heat sink 30 of each battery 1, so as to reduce a distance between the housing 10 and the temperature regulating board 60, thereby increasing the energy density of the battery 1.

The accommodating grooves 61 may be at least two, and the at least two accommodating grooves 61 correspond to the at least two batteries 1. Optionally, the accommodating groove 61 may be one, and the one accommodating groove 61 may correspond to the at least two batteries 1.

It should be noted that the temperature regulating board 60 may be located at a top of each battery 1. That is, the temperature regulating board 60 is disposed opposite to the second surface 12 of the battery 1, such that the heat sink 30 on the second surface 12 is directly opposite to the temperature regulating board 60. Therefore, the accommodating groove 61 may be provided on the temperature regulating board 60 to ensure that the heat sink 30 extends into the accommodating groove 61, thereby ensuring that a distance between the housing 10 and the temperature regulating board 60 is not too large. Although the multiple second surfaces 12 may all be provided with the heat sink 30 thereon, only for the heat sink 30 directly opposite to the temperature regulating board 60 that position avoidance needs to be considered. In some embodiments, the temperature regulating board 60 may also be located at a bottom end of each battery 1.

In one embodiment, as shown in FIG. 3, a gap 62 is provided between the heat sink 30 and the wall of the accommodating groove 61. The gap 62 is filled with thermal conductive adhesive, so as to ensure reliable heat conduction between the heat sink 30 and the housing 10.

Further, a thermal conductive adhesive is also filled between the housing 10 and the temperature regulating board 60 to ensure reliable heat conduction between the housing 10 and the temperature regulating board 60. Moreover, since the heat sink 30 extends into the accommodating groove 61, there is less thermal conductive adhesive configured to fill the housing 10, the heat sink 30, and the temperature regulating board 60, thereby increasing the energy density of the battery apparatus. The thermal conductive adhesive may be ultra-high temperature thermal conductive adhesive, organic silicon thermal conductive adhesive, epoxy resin AB adhesive, polyurethane adhesive, polyurethane thermal conductive adhesive, thermal conductive silicone grease, and the like. The thermal conductive adhesive is an insulating adhesive.

It should be noted that a safe distance between the heat sink 30 and the temperature regulating board 60 is required, so the heat sink 30 and the temperature regulating board 60 are provided at intervals. Needless to say, in some embodiments, it is possible that insulating materials may be coated on the heat sink 30 and/or the temperature regulating board 60, such that the heat sink 30 and the temperature regulating board 60 are in contact. The insulating material here needs to ensure that it has sufficient thermal conductivity.

The temperature regulating board 60 may be a liquid-cooled plate, an air-cooled plate, or other temperature regulating devices having a cooling or heating function.

In one embodiment, the temperature regulating board 60 is internally formed with a fluid circulation channel 63. The fluid circulation channel 63 is configured to communicate a fluid supplying member and a fluid receiving member, such that the fluid forms a circulating fluid in the temperature regulating board 60, so as to heat or cool the temperature regulating board 60. The fluid supplying member is configured to supply fluid to the fluid circulation channel 63, and the fluid receiving member is configured to recover the fluid. The fluid may be a liquid or a gas. Optionally, the fluid circulation channel 63 may be provided with non-circulating fluid. In other words, the fluid circulation channel 63 may be an enclosed space.

Figure 13:
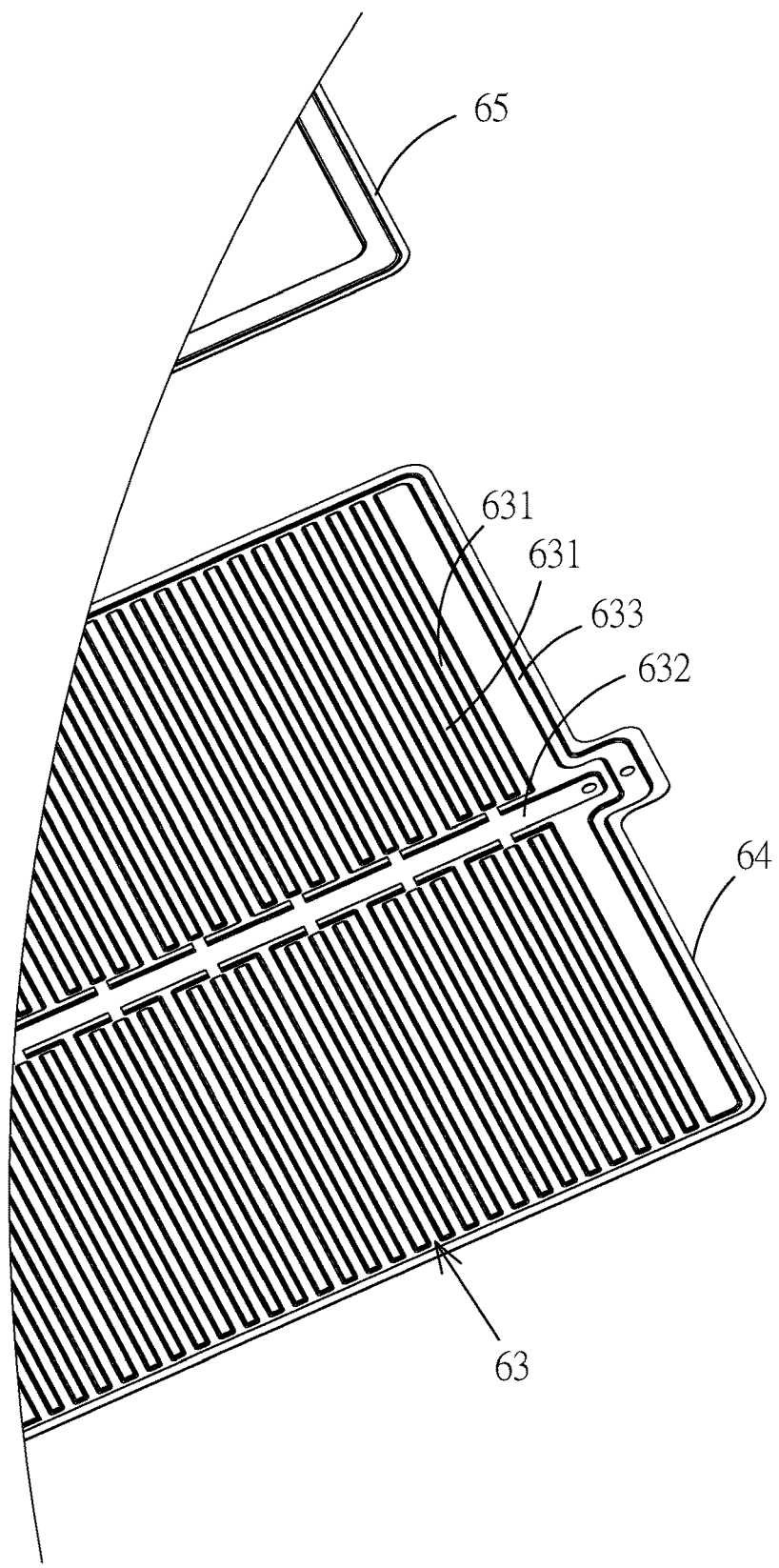
FIG. 13 is a schematic diagram showing a partially exploded structure of another view angle of a temperature regulating board according to an exemplary embodiment.
Figure 16:
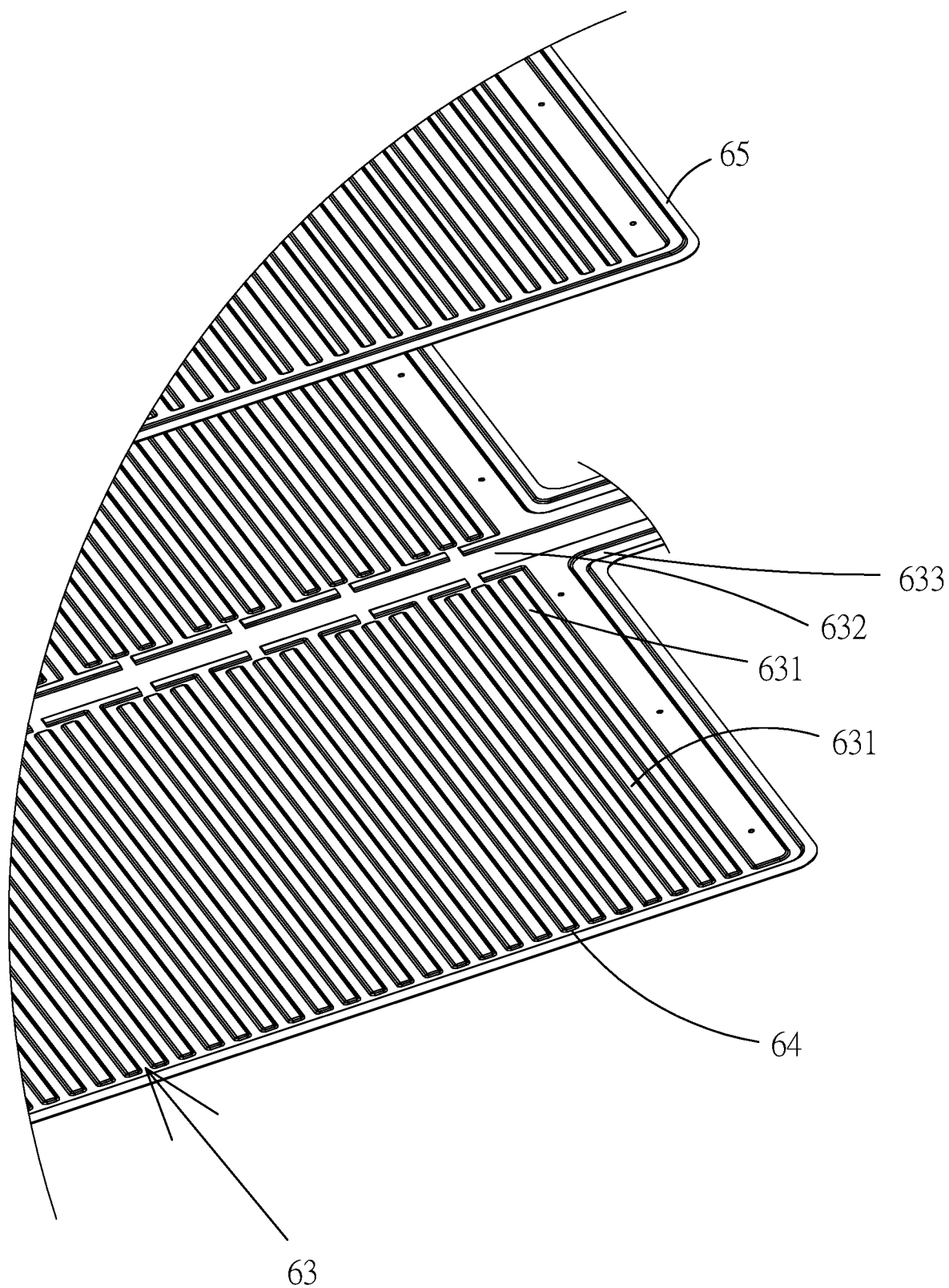
FIG. 16 is a schematic diagram showing a partially exploded structure of a temperature regulating board according to another exemplary embodiment.

In one embodiment, as shown in FIGS. 13 and 16, the fluid circulation channel 63 includes: first fluid channels 631, the first fluid channels 631 being at least two, wherein an accommodating groove 61 is provided between two adjacent first fluid channels 631. Extending directions of the first fluid channels 631 are parallel to an extending direction of the heat sink 30 located in the accommodating groove 61. Since the accommodating groove 61 is formed between the two first fluid channels 631, the heat sink 30 located in the accommodating groove 61 may be as close as possible to the first fluid channels 631, such that cooling or heating of the heat sink 30 may be realized more quickly.

It should be noted that one accommodating groove 61 being provided between two adjacent first fluid channels 631 is but to emphasize the positional relationship of the three in terms of the structural form. In fact, the first fluid channels 631 are an internal structure of the temperature regulating board 60, and the accommodating groove 61 is an external structure of the temperature regulating board 60, and what is emphasized herein is merely that the accommodating groove 61 is as close as possible to the first fluid channels 631. For example, two grooves at intervals may be punched from the inside of a flat plate; in such case, two protrusions at intervals are be formed on the outside of the flat plate. The two grooves may be regarded as the first fluid channels 631, and the space formed between the two protrusions is the accommodating groove 61, such that the accommodating groove 61 may be made as close as possible to the first fluid channels 631. At this time, at least part of the accommodating groove 61 and the first fluid channels 631 are located inside a same horizontal space. Of course, the accommodating groove 61 may also be located below the first fluid channels 631. In other words, the accommodating groove 61 and the first fluid channels 631 are not located in the same horizontal space but form an up-and-down distribution. However, at this time, projections of the two first fluid channels 631 and of the accommodating groove 61 on the horizontal plane make projections of the accommodating groove 61 sandwiched between the projections of the two first fluid channels 631. Therefore, it may also be understood that an accommodating groove 61 is provided between the two first fluid channels 631.

In one embodiment, the number of accommodating grooves 61 is greater than the number of batteries 1, such that the number of first fluid channels 631 may be larger, so as to ensure that the temperature regulating board 60 can perform rapid temperature regulation. Optionally, the number of first fluid channels 631 corresponding to each battery 1 may be greater than or equal to three. Therefore, each battery 1 may correspond to at least two accommodating grooves 61. In such case, the heat sink 30 of the battery 1 may be optionally accommodated in one accommodating groove 61. Of course, in some embodiments, the battery 1 may also correspond to at least two heat sinks 30 disposed at intervals. In this case, the heat sinks 30 may be disposed corresponding to the accommodating grooves 61 one by one.

In an embodiment, as shown in FIGS. 13 and 16, the fluid circulation channel 63 further includes: a second fluid channel 632, the second fluid channel 632 communicating with the fluid supplying member and communicating with each first fluid channels 631, such that the fluid supplying member supplies fluid to each of the first fluid channels 631 through the second fluid channel 632; and a third fluid channel 633, the third fluid channel 633 communicating with the fluid receiving member and communicating with each of the first fluid channels 631, such that the fluid in the first fluid channels 631 fluids into the fluid receiving member through the third fluid channel 633. The fluid enters the temperature regulating board 60 from the second fluid channel 632, and is divided into the first fluid channels 631, and the fluid in each of the first fluid channels 631 may be converged through the third fluid channel 633, so as to perform circulating cooling or heating of the fluid in the temperature regulating board 60. Each of the first fluid channels 631 may be disposed in groups. In other words, multiple first fluid channels 631 form a group, and each group is communicated with the second fluid channel 632 through an opening. Alternatively, each of the first fluid channels 631 may be directly communicated with the second fluid channel 632; no limitation is imposed herein.

In one embodiment, two sides of the second fluid channel 632 are respectively communicated with one group of first fluid channels 631, such that the second fluid channel 632 may fluid into different first fluid channels 631, thereby forming a rapid fluid. In this embodiment, the second fluid channel 632 is located at a middle position of the temperature regulating board 60. The one group of first fluid channels 631 is to illustrate that one side of the temperature regulating board 60 corresponds to multiple first fluid channels 631, and the number of the first fluid channels 631 is not limited.

Further, the third fluid channel 633 is disposed around the first fluid channels 631 and the second fluid channel 632, such that the fluid in each of the first fluid channels 631 may be converged into the third fluid channel 633 in time for discharge. In this embodiment, the third fluid channel 633 is located at a position of the temperature regulating board 60 close to a circumferential outer edge thereof.

Optionally, the second fluid channel 632 may be located at a position of the temperature regulating board 60 close to a circumferential outer edge thereof, and the third fluid channel 633 is located at the middle position of the temperature regulating board 60. That is, two sides of the third fluid channel 633 are respectively communicated with one group of first fluid channels 631, and the second fluid channel 632 is disposed around the first fluid channels 631 and the third fluid channel 633.

In one embodiment, as shown in FIGS. 13 and 16, the second fluid channel 632 is located at the middle position of the temperature regulating board 60. Two sides of the second fluid channel 632 respectively have multiple first fluid channels 631, and at least the two first fluid channels 631 form a fluid channel group. Each fluid channel group is communicated with the second fluid channel 632 through an opening, and the third fluid channel 633 is disposed around the first fluid channels 631 and the second fluid channel 632, such that the fluid in each of the first fluid channels 631 may completely fluid through the first fluid channels 631 and then be converged into the third fluid channel 633.

In one embodiment, at least one of a bottom end of the second fluid channel 632 and a bottom end of the third fluid channel 633 is located in a same plane as a bottom end of the first fluid channel 631. In other words, distances between the bottom ends of the first fluid channel 631, of the second fluid channel 632, and of the third fluid channel 633 are at an equal distance from the same horizontal plane on the housing 10. While ensuring that the fluid may circulate properly between the first fluid channels 631, the second fluid channel 632, and the third fluid channel 633, such configuration also provides high structural reliability and is convenient for processing.

In an embodiment, at least one of the bottom end of the second fluid channel 632 and the bottom end of the third fluid channel 633 is located above the bottom end of the first fluid channels 631, thereby facilitating fluid circulation and effectively reducing pressure loss.

In one embodiment, as shown in FIGS. 10 to 16, the temperature regulating board 60 includes: a first plate body 64, the first plate body 64 provided with an accommodating groove 61; and a second plate body 65, the second plate body 65 connected to the first plate body 64 to form the fluid circulation channel 63 between the second plate body 65 and the first plate body 64. The first plate body 64 and the second plate body 65 are disposed independently, which may facilitate the formation of the internal fluid circulation channel 63.

Optionally, the first plate body 64 and the second plate body 65 may be detachably disposed. Alternatively, the first plate body 64 and the second plate body 65 may be undetachable.

In one embodiment, the first plate body 64 is internally formed with all of the first fluid channels 631, and the second plate body 65 is internally formed with all of the second fluid channel 632 and the third fluid channel 633. In other words, the second fluid channel 632 and the third fluid channel 633 are both designed in layers with the first fluid channels 631. In such case, the second fluid channel 632 and the third fluid channel 633 need to be partially directly opposite to the first fluid channels 631 so as to ensure normal fluid of the fluid.

Optionally, the first plate body 64 is internally formed with all of the first fluid channels 631 and part of the second fluid channel 632 and the third fluid channel 633, and the second plate body 65 is internally formed with part of the second fluid channel 632 and the third fluid channel 633, such that the second fluid channel 632 and the third fluid channel 633 both form a height difference with the first fluid channels 631, and that the temperature regulating board 60 includes one upper and one lower fluid channel inside, which may effectively reduce the pressure loss.

Optionally, the first plate body 64 is internally formed with all of the first fluid channels 631, the second fluid channel 632, and the third fluid channel 633. In other words, the second plate body 65 only performs sealing protection of the fluid circulation channel 63, which is relatively simple and less difficult in the processing in terms of structure.

Optionally, the first plate body 64 is internally formed with part of the first fluid channels 631, the second fluid channel 632, and the third fluid channel 633, and the second plate body 65 is internally formed with part of the first fluid channels 631, the second fluid channel 632, and the third fluid channel 633, so as to ensure that enough fluid circulation space inside the temperature regulating board 60 is provided, thereby providing temperature regulating ability.

Figure 12:
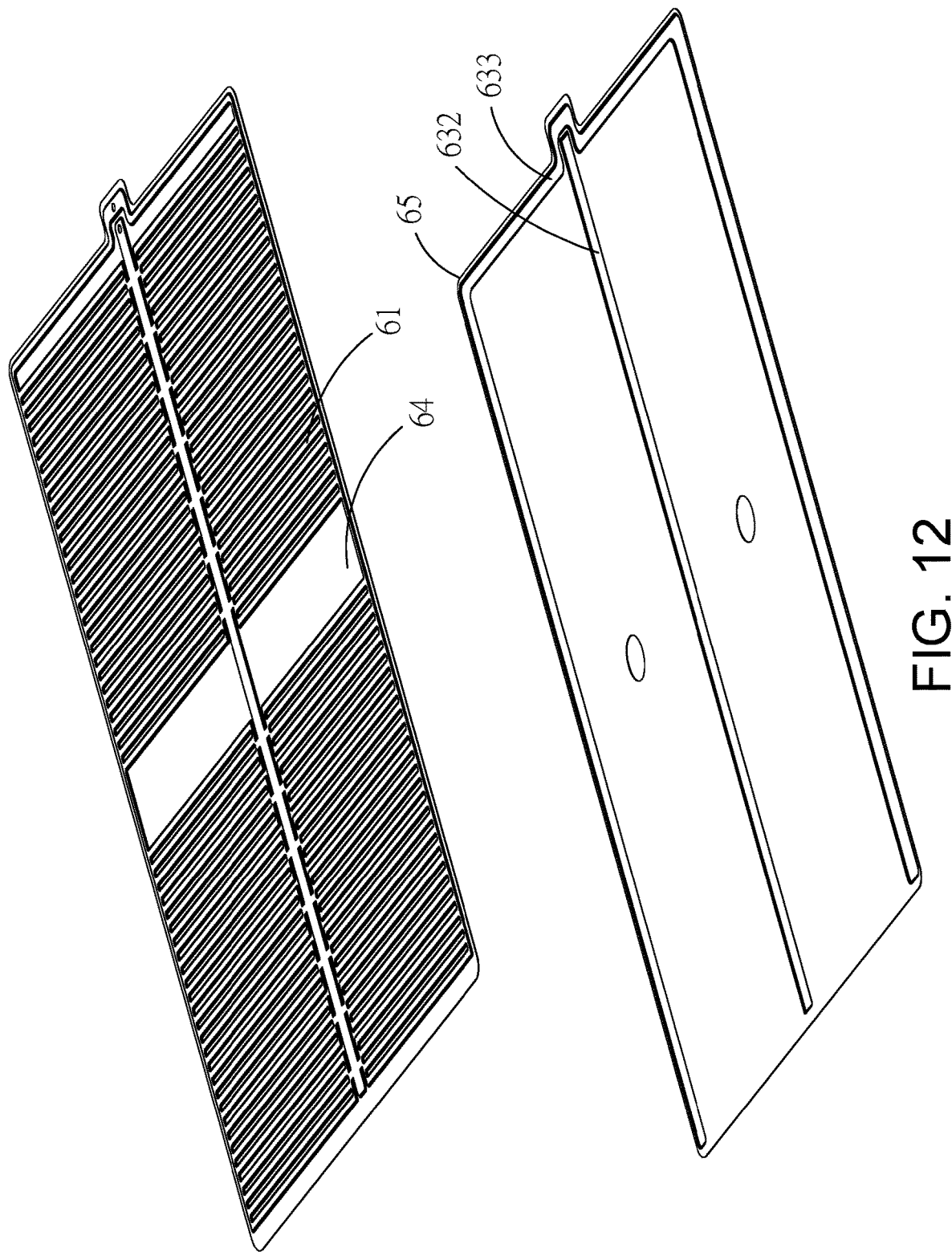
FIG. 12 is a schematic diagram showing an exploded structure of a view angle of a temperature regulating board according to an exemplary embodiment.

It should be noted that, as shown in FIGS. 10 to 13, both an external structure and an internal structure of the first plate body 64 and the second plate body 65 of the temperature regulating board 60 in the embodiment may be different: the second plate body 65 may be provided with only the second fluid channel 632 and the third fluid channel 633, and the first plate body 64 is internally formed with the first fluid channels 631, the second fluid channel 632, and the third fluid channel 633, as specifically shown in FIG. 12 and FIG. 13.

Figure 14:
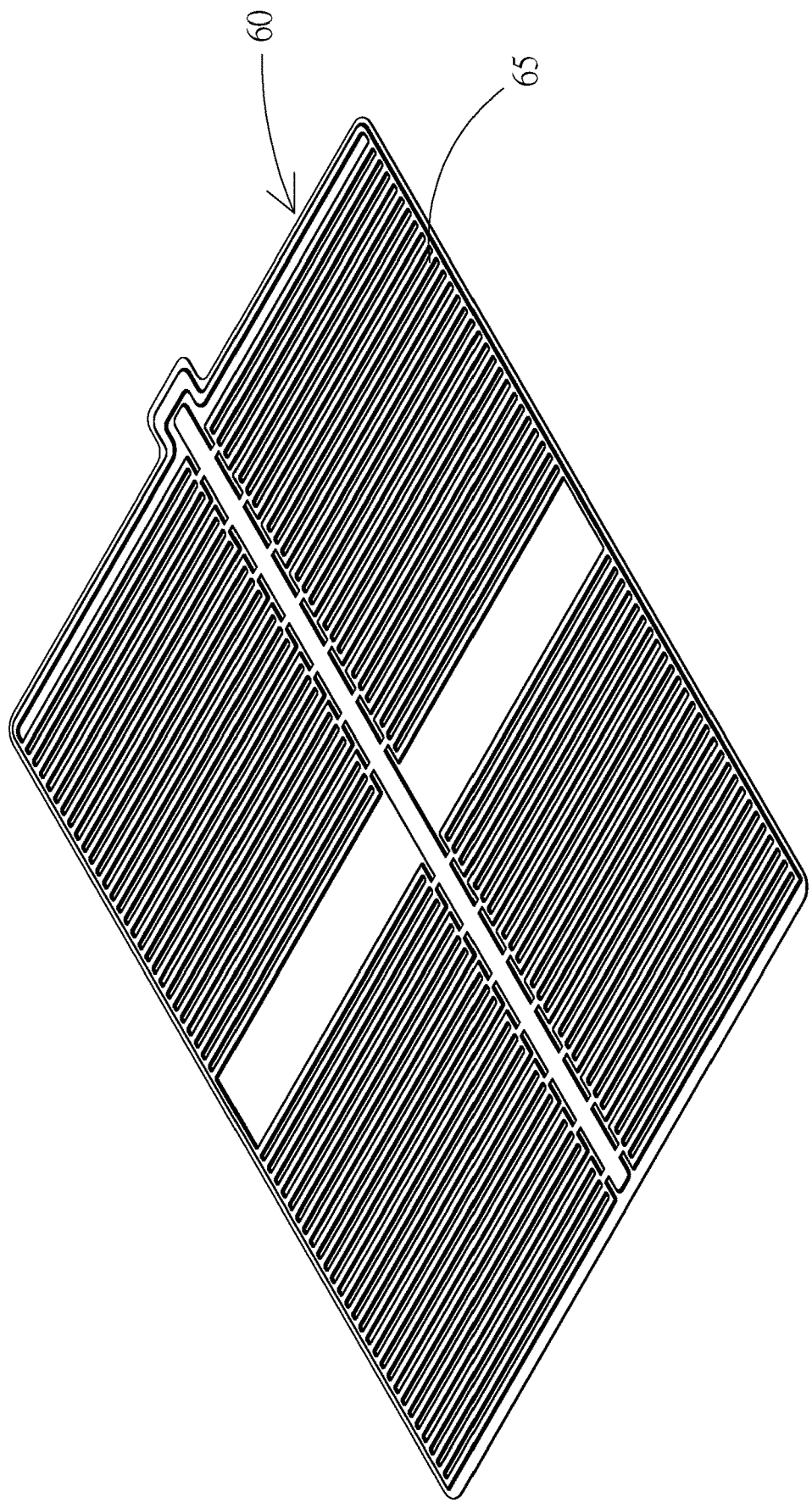
FIG. 14 is a schematic diagram showing a structure of another view angle of a temperature regulating board according to another exemplary embodiment.
Figure 15:
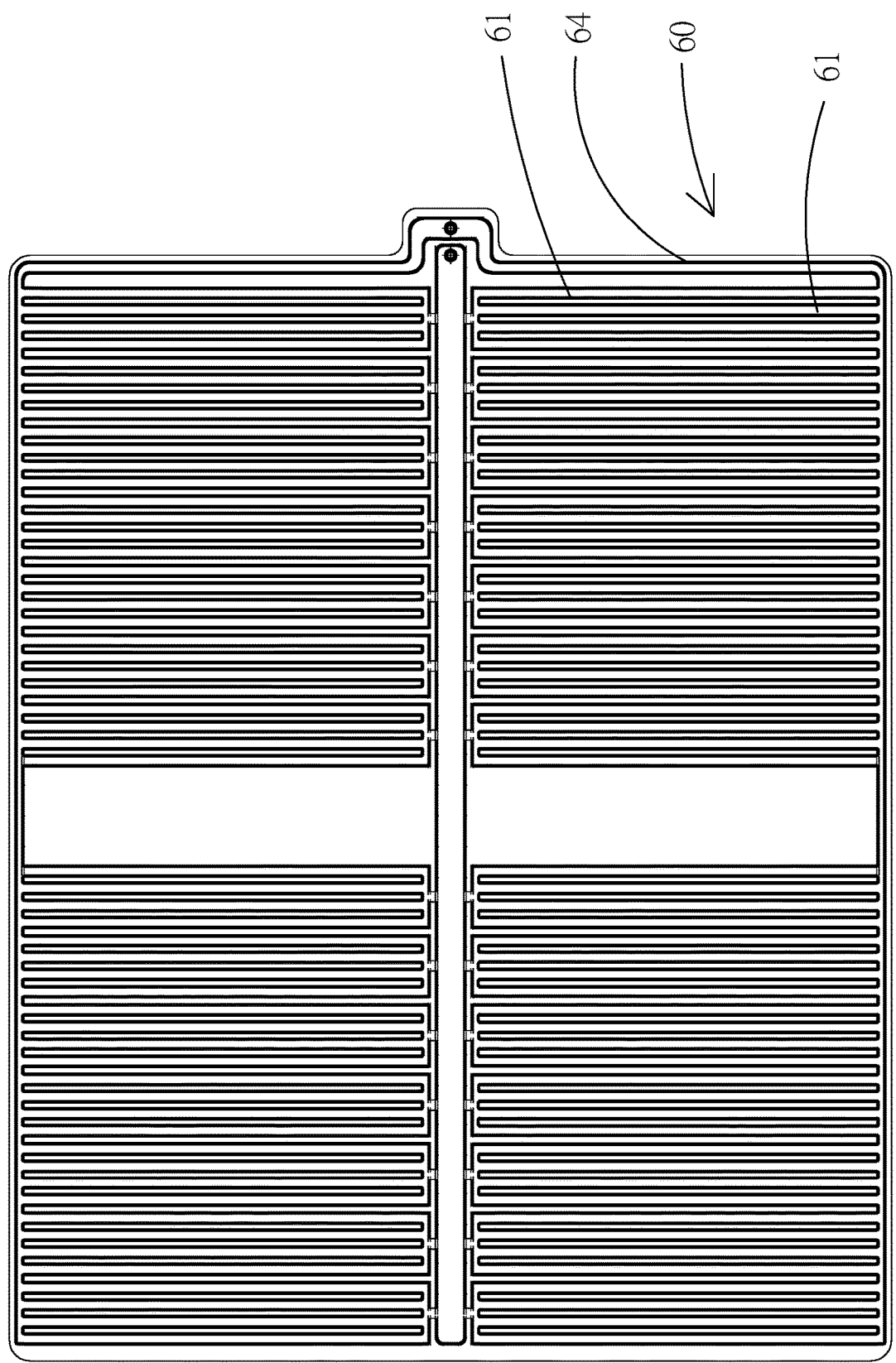
FIG. 15 is a schematic diagram showing a structure of another view angle of a temperature regulating board according to another exemplary embodiment.

As shown in FIGS. 14 to 16, the external structure and the internal structure of the first plate body 64 and the second plate body 65 of the temperature regulating board 60 in this embodiment may be substantially the same: the first plate body 64 and the second plate body 65 may both be provided with the first fluid channels 631, the second fluid channel 632, and the third fluid channel 633.

In one embodiment, the battery is a laminated battery, which not only is convenient to form, but also may be processed to obtain a battery of longer length.

Specifically, the cell 20 is a laminated cell. The cell 20 has a first electrode sheet laminated with each other, a second electrode sheet electrically opposite to the first electrode sheet, and a diaphragm sheet disposed between the first electrode sheet and the second electrode sheet, such that multiple pairs of the first electrode sheets and the second electrode sheets are stacked to form a laminated cell.

Optionally, the battery may be a wound battery. In other words, the first electrode sheet, the second electrode sheet that is electrically opposite to the first electrode sheet, and the diaphragm sheet disposed between the first electrode sheet and the second electrode sheet are wound, so as to obtain the wound battery.

The battery apparatus in the embodiments may be a battery module or a battery pack. At least two battery apparatuses may share one temperature regulating board 60, and needless to say, that each battery apparatus may correspond to one temperature regulating board 60 respectively.

It should be noted that for other structures of the battery 1 in the battery apparatus, reference may be made to the structure of the above-mentioned battery, which will not be repeated here.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:
   a housing;
   a cell, the cell disposed in the housing;
   a pole element, the pole element disposed on the housing; and
   a heat sink, the heat sink disposed on the housing,
   wherein the housing comprises:
   a first housing member;
   a second housing member, the second housing member connected with the first housing member so as to close the cell,
   wherein the first housing member and the heat sink thereon are integrally formed; and/or,
   the second housing member and the heat sink thereon are integrally formed,
   wherein at least one of the first housing member and the second housing member is provided with the heat sink and the pole element thereon, the heat sink is provided at a circumferential outer edge of the first housing member, the heat sink is provided at a circumferential outer edge of the second housing member, and the heat sink on the first housing member is welded to the heat sink on the second housing member.

2. The battery according to claim 1, wherein a length of the battery is a, a width of the battery is b, and a height of the battery is c, in which 2b≤a≤50b, and/or 0.5c≤b≤20c; and 400 mm≤a≤2500 mm.

3. A battery apparatus, comprising a plurality of batteries disposed along a first direction, the battery comprising:
   a housing;
   a cell, the cell disposed in the housing;
   a pole element, the pole element disposed on the housing; and
   a heat sink, the heat sink disposed on the housing,
   wherein the housing comprises:
   a first housing member;
   a second housing member, the second housing member connected with the first housing member so as to close the cell, wherein the first housing member and the heat sink thereon are integrally formed; and/or, the second housing member and the heat sink thereon are integrally formed, wherein at least one of the first housing member and the second housing member is provided with the heat sink and the pole element thereon, the heat sink is provided at a circumferential outer edge of the first housing member, the heat sink is provided at a circumferential outer edge of the second housing member, and the heat sink on the first housing member is welded to the heat sink on the second housing member.

4. The battery apparatus of claim 3, wherein the housing comprises two first surfaces opposite in the first direction and four second surfaces disposed around the first surfaces; at least one of the second surfaces is provided with a heat sink thereon, and the heat sink extends from the second surface.

5. The battery apparatus according to claim 4, wherein an area of the first surface is larger than an area of the second surface.

6. The battery apparatus according to claim 4, the battery apparatus further comprising:
a frame assembly, the frame assembly formed with a clamping space, and each of the batteries is located in the clamping space.

7. The battery apparatus according to claim 6, the frame assembly comprising:
first pretensioners, the first pretensioners being two, the two first pretensioners disposed opposite to each other, and each of the batteries clamped between the two first pretensioners; and
a second pretensioner, the second pretensioner connected with the two first pretensioners so as to clamp the battery in the clamping space.

8. The battery apparatus according to claim 7, wherein the second pretensioners are disposed in pairs, and the two second pretensioners in pairs are respectively located at two sides of the battery so as to form the clamping space with the two first pretensioners.

9. The battery apparatus according to claim 7, wherein the second pretensioner is a circumferentially closed structure so as to cover each of the batteries and the two first pretensioners.

10. The battery apparatus according to claim 7, wherein the two first pretensioners and the second pretensioner are an integral structure.

11. The battery apparatus according to claim 7, wherein the first pretensioner is an end plate, and the end plate is opposite to the first surface of the battery; and
the second pretensioner is a cable tie, and the cable tie is opposite to the second surface of each of the batteries.

12. The battery apparatus according to claim 7, the battery apparatus further comprising:
a circuit board, the circuit board disposed on one side of the battery; and
a separator, the separator located on a side of the circuit board away from the battery, and the second pretensioner pressed on the separator.

13. The battery apparatus according to claim 3, the battery apparatus further comprising:
a temperature regulating board, the temperature regulating board provided with an accommodating groove, and the accommodating groove accommodating the heat sink of each of the batteries.

14. The battery apparatus according to claim 13, wherein a gap is provided between the heat sink and a wall of the accommodating groove, and the gap is filled with thermal conductive adhesive; and
the thermal conductive adhesive is also filled between the housing and the temperature regulating board.

15. The battery apparatus according to claim 13, wherein the temperature regulating board is formed with a fluid circulation channel.

16. The battery apparatus according to claim 15, wherein the fluid circulation channel comprises:
first fluid channels, the first fluid channels being at least two, and one accommodating groove disposed between the two adjacent first fluid channels;
wherein extending directions of the first fluid channels are parallel to an extending direction of the heat sink located in the accommodating groove.

17. The battery apparatus according to claim 16, wherein the fluid circulation channel further comprises:
a second fluid channel, the second fluid channel communicating with the fluid supplying member and communicating with each of the first fluid channels, such that the fluid supplying member supplies fluid to each of the first fluid channels through the second fluid channel; and
a third fluid channel, the third fluid channel communicating with the fluid receiving member and communicating with each of the first fluid channels, such that the fluid in the first fluid channels fluid through the third fluid channel into the fluid receiving member.

18. The battery apparatus according to claim 17, wherein two sides of the second fluid channel are respectively communicated with a group of the first fluid channels; and
the third fluid channel is disposed around the first fluid channels and the second fluid channel.

19. The battery apparatus according to claim 17, wherein at least one of a bottom end of the second fluid channel and a bottom end of the third fluid channel is in a same plane as a bottom end of the first fluid channel; or,
at least one of the bottom end of the second fluid channel and the bottom end of the third fluid channel is located above the bottom end of the first fluid channel.

20. The battery apparatus according to claim 17, wherein the temperature regulating board comprises:
a first plate body, the first plate body provided with the accommodating groove; and
a second plate body, the second plate body connected with the first plate body, such that the fluid circulation channel is formed between the second plate body and the first plate body.

21. The battery apparatus according to claim 20, wherein the first plate body is internally formed with all of the first fluid channels, and the second plate body is internally formed with all of the second fluid channel and the third fluid channel;
or, the first plate body is internally formed with all of the first fluid channels and part of the second fluid channel and the third fluid channel, and the second plate body is internally formed with part of the second fluid channel and the third fluid channel;
or, the first plate body is internally formed with all of the first fluid channels, the second fluid channel, and the third fluid channel;
or, the first plate body is internally formed with part of the first fluid channels, the second fluid channel and the third fluid channel, and the second plate body is internally formed with part of the first fluid channels, the second fluid channel and the third fluid channel.

* * * * *